F. W. ALBRECHT.
ROTARY SAW TRIMMER.
APPLICATION FILED JULY 27, 1910.

977,256.

Patented Nov. 29, 1910.

WITNESSES.
C. H. Bills.
E. E. Thomas.

INVENTOR.
Frederich W. Albrecht,
By Owen & Owen
His attys.

UNITED STATES PATENT OFFICE.

FREDERICK W. ALBRECHT, OF TOLEDO, OHIO, ASSIGNOR OF ONE-HALF TO CHARLES H. SHIELDS, OF TOLEDO, OHIO.

ROTARY-SAW TRIMMER.

977,256.  Specification of Letters Patent.  Patented Nov. 29, 1910.

Application filed July 27, 1910. Serial No. 574,103.

*To all whom it may concern:*

Be it known that I, FREDERICK W. AL-BRECHT, a citizen of the United States, and a resident of Toledo, in the county of Lucas and State of Ohio, have invented a certain new and useful Rotary-Saw Trimmer; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to means for use in connection with rotary saws or cutters for planing the edge of work during a sawing operation.

The object of my invention is the provision of improved planing means of this type, which is simple and economical in its construction, and capable of being easily and quickly removed or inserted into position within its carrying part, thus facilitating the substitution of one for another as one in use may become dull or broken.

The invention is fully described in the following specification and a preferred embodiment thereof illustrated in the accompanying drawings, in which,—

Figure 1:
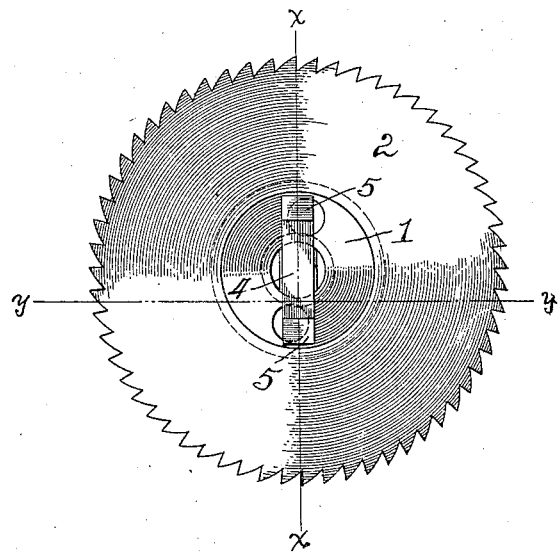
Figure 2:
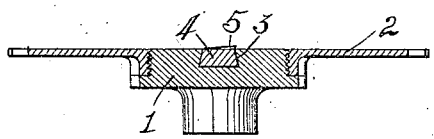
Figure 3:
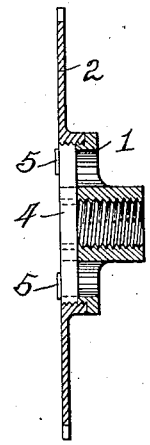

Figure 1 is a face view of a saw with my invention associated therewith, and Figs. 2 and 3 are cross-sections on the lines $x$, $x$ and $y$, $y$ respectively, in Fig. 1.

Referring to the drawings, 1 designates an arbor, which is screwed onto or otherwise suitably carried by a shaft (not shown), and 2 an ordinary type of rotary saw, which is preferably threaded upon the arbor, as shown.

The arbor is provided on its outer face with a diametrically-disposed groove 3, which extends entirely or nearly across the arbor, and is preferably dove-tailed to adapt it to hold a complemental or correspondingly shaped bar or insert 4 against lateral removal therefrom.

The bar or insert 4 preferably comprises a single piece, and is provided on its outer side adjacent its ends with trimming or planing teeth 5, which have their cutting edges disposed in the direction of revolution of the respective ends of the bar when turning with the saw in making a cut. When the saw is mounted on the arbor the ends of the bar 4 preferably abut against the inner periphery of the saw opening, or may thread into such opening, as shown in Fig. 2, if desired, thus securely locking the bar against movement within the arbor.

It is evident that this provides a very simple and inexpensive means of rigidly securing the planing teeth or parts to the saw arbor, and enables the same to be easily and quickly removed when dull or broken or for other reasons and another one substituted therefor, as to remove a bar 4 it is only necessary to remove the saw from its arbor and then slide the bar from its holding groove.

I wish it understood that my invention is not limited to any specific construction or arrangement of the parts except in so far as such limitations are specified in the claims.

Having thus described my invention, what I claim as new and desire to secure by Letters Patent, is,—

1. In combination, a saw carrying arbor, work planing means removably carried thereby, and a saw mounted on such arbor in the plane of said means and coöperating with the arbor to rigidly hold said means.

2. In combination, a saw-carrying arbor having its outer face grooved, work trimming means removably mounted within such groove, and a rotary saw carried by the arbor in the radial plane of said means and coöperating with the arbor to rigidly hold said means.

3. In combination, an arbor having a diametrically-disposed groove in its outer face, a bar removably mounted in such groove and having work trimming teeth on its outer side adjacent to its ends, and a rotary saw removably mounted on such arbor and coöperating therewith to hold said bar.

4. In combination, an arbor having a diametrically-disposed dove-tailed groove in its outer face, a bar removably fitting into such groove and having work trimming means on its outer side, and a saw removably carried by the arbor and preventing a removal of said bar therefrom.

5. In combination, an arbor having a groove across its face, a trimmer bar removably mounted in such groove, and a rotary saw removably threaded onto such arbor and the outer ends of such bar.

6. In combination, a saw carrying arbor having its outer end diametrically grooved, a rotary saw mounted on the arbor and a bar mounted in said groove, and having laterally projecting teeth adjacent its ends.

In testimony whereof, I have hereunto signed my name to this specification in the presence of two subscribing witnesses.

FREDERICK W. ALBRECHT.

Witnesses:
C. W. OWEN,
E. E. THOMAS.